Sept. 1, 1959 E. GAGNAN 2,902,031
OPEN CIRCUIT BREATHING APPARATUS
Filed June 7, 1954 2 Sheets-Sheet 1

INVENTOR
EMILE GAGNAN
BY
PATENT ATTORNEY

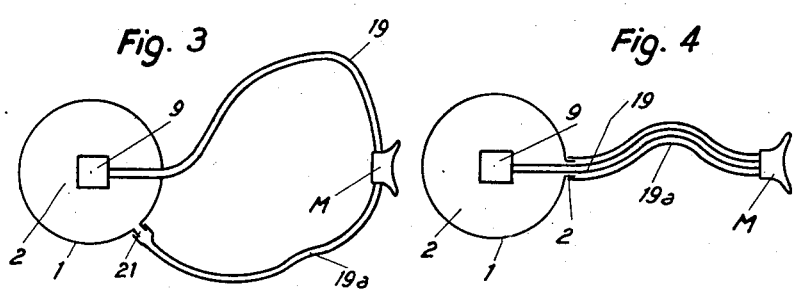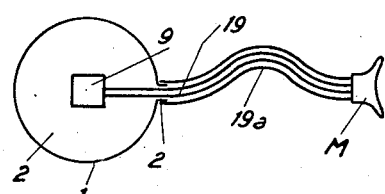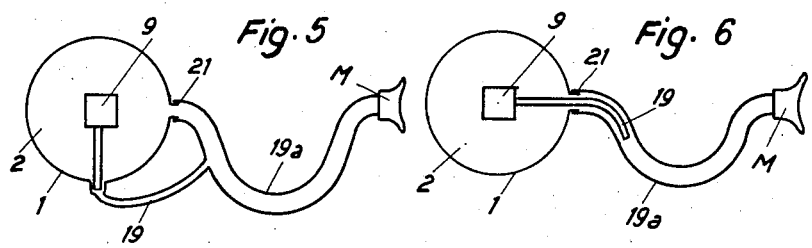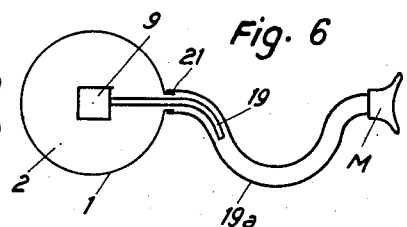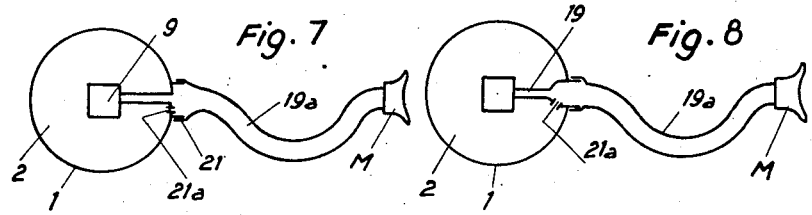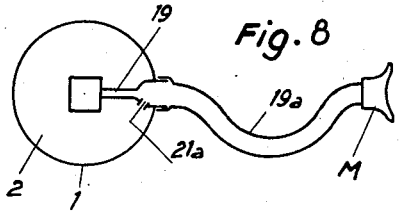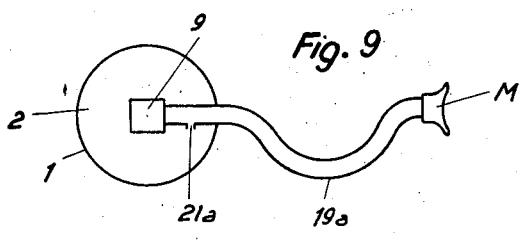

United States Patent Office 2,902,031
Patented Sept. 1, 1959

2,902,031

OPEN CIRCUIT BREATHING APPARATUS

Emile Gagnan, Montreal, Quebec, Canada, assignor to La Spirotechnique, Societe Anonyme Application June 7, 1954, Serial No. 434,859

Claims priority, application France June 11, 1953

6 Claims. (Cl. 128—142)

The present invention relates to the open circuit respiratory apparatus in which a respirable gas, air, for instance, compressed under a very high pressure in a cylinder is expanded in a pressure regulator to a pressure substantially equal to that of the unbreathable medium inside which the user is moving, and fed under this pressure to the respiratory tracts of the latter who expels the breathed gas directly into said medium.

Known pressure regulators used in this type of apparatus comprise essentially of a chamber provided with a diaphragm having an outer face subjected to the pressure of the medium surrounding the regulator chamber. Deformation of the diaphragm controls an inlet valve controlling the supply of air to the regulator chamber from the high pressure cylinder. The valve is arranged so that it opens as soon as the pressure inside the regulator chamber falls to a certain value below the pressure of the surrounding medium and closes immediately the pressure within the chamber is at least equal to the outside pressure of the surrounding medium. Usually, the user of the apparatus draws air from the chamber through a single flexible hose or conduit leading to the mouthpiece or mask. In order that he can freely draw in sufficient air, and to avoid load losses, the flexible hose is usually made as having a relatively large diameter. Consequently, the hose has a fairly large capacity which of course is increased relative to its length. These conditions give the following undesirable effect: When the user inhales, the pressure drop in the chamber causes an instant action of the air inlet valve, causing an injection of pressurized air balancing pressure to the surrounding medium and, accordingly, causes the valve to close almost immediately while the initial depression still exists in the air-conducting hose and the respiratory tracts of the user. To overcome this, the user breathes more quickly causing a succession of openings and closings of the valve or "whirring" which is tiring to the user.

The present invention aims to eliminate this disadvantage by providing an air intake conduit which receives, at least in part, the air under pressure directly from the valve of the regulator with a balancing circuit preferably separate, at least in part, from the air intake conduit to balance the pressure in the regulator chamber.

Other features of the invention will be set forth in the following description of forms of embodiment represented by way of examples only in the accompanying drawings wherein:

Figures 3 to 9 are explanatory diagrams which show a number of possible modifications in the application of the invention.

Figure 1:
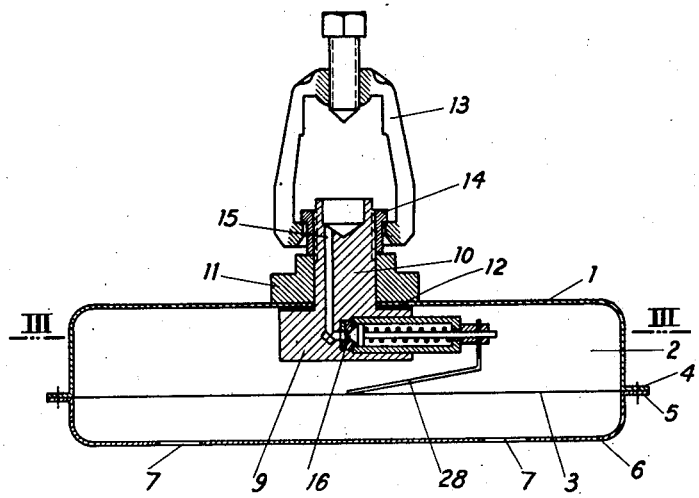
Figure 1 is an axial section through line II—II in Figure 2, of a pressure regulator designed for use in a respiratory apparatus according to the invention.
Figure 2:
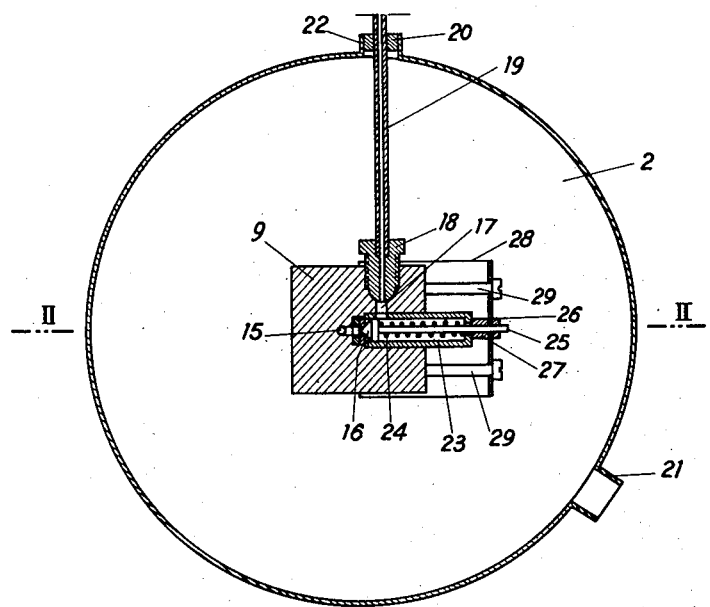
Figure 2 is a corresponding plan view with a cross section through line III—III in Figure 1.

In the embodiments of Figures 1 and 2, the regulator represented includes the casing 1 inside which the chamber 2 is provided, one deformable wall of which is constituted by the flexible diaphragm 3. This diaphragm, for instance, is clamped along its periphery between a flange 4 of the casing 1 and a corresponding flange 5 of a bottom or cover 6 pierced at 7 for allowing the pressure of the surrounding medium—the unbreathable atmosphere or water in the case of a respiratory apparatus for diving—to be permanently applied on the outer face of the diaphragm.

In known apparatus the chamber 2 is connected through a pipe, generally a flexible hose, with the mouthpiece or mask into which the user breathes in when making an in-breathing motion. The depression caused by in-breathing inside the chamber 2 depresses the diaphragm 3 towards the inside of the chamber and this deformation of the diaphragm is utilized for opening the valve 16 which allows the air or other breathable gas, contained under a very high pressure inside the cylinder, to enter the chamber 2, causing the already mentioned drawbacks. Expiration takes place outside the mask or through the mouthpiece, through an outlet valve which, in the case of a diving apparatus, is arranged at the end of a pipe and placed as close as possible to the center of thrust of the diaphragm 3 but which, in the case of a respiratory apparatus in an unbreathable atmosphere, may be placed at any other suitable place and, for instance, on the mask or mouthpiece.

In the embodiment shown by Figures 1 and 2, the air outlet valve 16 is arranged inside a valve box 9 secured on the bottom of the casing 1 and the entrance to which is connected with the cylinder. The box 9 is, for instance as shown, provided with a threaded tailpiece 10 which passes through a central hole at the bottom of the casing 1 and receives a lock nut 11, tightness being ensured by a suitable gasket interposed at 12. A yoke 13 attached to the tailpiece 10 by a nut 14 makes it possible to connect the cylinder with the inlet to the valve box 9.

The passage 15 for feeding high pressure air into the box 9 reaches the seat of the valve 16 downstream of which the outlet passage 17 is provided, connected through a coupling member 18 screwed into a tapping in the box 9 with a pipe 19 going through the wall of the box through a tight gasket 20, said pipe 19 being connected, through a flexible hose for instance, with the mask or mouthpiece. For the reasons set forth above, the pipe 19 and the hose which extends it may have a small diameter (a few millimeters) while, in known apparatus the diameter of the in-breathing pipe, for not hindering breathing and not tiring the user, is generally of 15 to 20 millimeters.

The conduit which connects the chamber 2 with the mask or mouthpiece may be obtained by any one of the following arrangements:

One or more calibrated holes 21a (Figures 8 and 9) are provided in the wall of the pipe 19 inside the chamber 2.

In this case, the diameter of the pipe 19, at least in its portion between the hole 21a and the mouthpiece M, has a diameter large enough for suitably minimizing the load losses.

A nipple 21 (Figure 2) is provided on the casing 1 and connected through a flexible hose 19a (Figure 3) with the mouthpiece or mask M, the arrangement of the in-breathing pipe 19 remaining that represented in Figure 1, the two pipes 19 and 19a, possibly, being both of a small diameter.

The pipe 19 is arranged inside a second pipe 19a connected with the nipple 22 deprived of the gasket 20 (Figure 4) and connected with the mask or mouthpiece M in such a manner that the channel which places the mask or mouthpiece in communication with the chamber 2 be constituted by the annular space between the two pipes 19 and 19a (Figure 4).

The pipe 19 may connect the outlet from the valve 16 with an intermediate point of the pipe 19a which connects the nipple 21 of the casing with the mouthpiece M (Figure 5). In this case, the pipe 19a has a suitable diameter for minimizing the load losses and the pipe 19 may have a small diameter.

The pipe 19 may be extended inside the pipe 19a through the nipple 21 (Figure 6). It may also open into the pipe 19a through the chamber 2, a calibrated hole 21a placing the pipe 19a and chamber 2 in communication.

In the embodiments shown in Figures 1 and 2 the inlet valve 16 is guided inside a sleeve 23, screwed, for instance, into a tapping of the valve box 9; it is urged towards its seat by a spring 24 and its stem 25, extended outside the sleeve 23, carries a stop 26 between which and a stop 27 secured on the box 9 is engaged one wing of a bent shutter 28, the other wing of which is in contact with the inner face of the diaphragm 3. This shutter is notched for allowing the passage of the stem 25 and it is guided, with an important clearance, on the screw shanks 29 secured on the box 9. Since the coming out of the air under a high pressure does not take place in the chamber adjacent to the membrane, the valve box 9 may possibly be placed outside this chamber, the coupling between the diaphragm 3 and the inlet valve 16 being obtained by any suitable means.

What I claim is:

1. In an open circuit breathing apparatus of the type in which an inlet valve for a breathable gas fed from a gas cylinder is controlled by a pressure regulator having a diaphragm the outer face of which is subjected to the pressure of the surrounding medium, a first inner pipe for direct connection of the outlet of said regulator valve with the respiratory tracts of the user, and a second outer flexible hose of greater diameter than and surrounding said first pipe, said second hose providing for connection of the respiratory tracts of the user with the inner chamber of said regulator adjacent the inner face of said diaphragm with the annular space between said first pipe and second hose constituting a gas conducting passage between said regulator chamber and the respiratory tracts of the user.

2. In an open circuit breathing apparatus of the type in which an inlet valve for a breathable gas fed from a gas cylinder is controlled by a pressure regulator having a diaphragm the outer face of which is subjected to the pressure of the surrounding medium, a first inner pipe directly connected to the outlet of said regulator valve, and having a portion extending exteriorly of said regulator chamber, and a second outer flexible hose of greater diameter than and surrounding said first pipe, said second hose providing for connection of the respiratory tracts of the user with the inner chamber of the regulator adjacent the inner face of the diaphragm with the annular space between said first pipe extending beyond said regulator chamber and said outer hose constituting a gas conducting passage between said regulator and the respiratory tracts of the user.

3. In an open circuit breathing apparatus of the type in which an inlet valve for a breathable gas fed from a gas cylinder is controlled by a pressure regulator having a diaphragm the outer face of which is subjected to the pressure of the surrounding medium, a first conduit connected directly to the outlet of said regulator valve and having a portion extending exteriorly of said regulator chamber into communication with a second conduit extending from said regulator inner chamber to the respiratory tracts of the user, the interior of said second conduit constituting a circuit balancing gas conducting passage between said regulator and the respiratory tracts of the user.

4. In an open circuit breathing apparatus of the type in which an inlet valve for a breathable gas fed from a gas cylinder is controlled by a pressure regulator having a diaphragm the outer face of which is submitted to the pressure of the surrounding medium, a pipe for connecting the outlet of the breathable gas inlet valve with the respiratory tracts of the user, said pipe being provided with a calibrated hole for putting in communication the inside of said pipe with the chamber of the regulator adjacent to the inner face of the diaphragm.

5. In an open circuit breathing apparatus of the type in which an inlet valve for a breathable gas fed from a gas cylinder is controlled by a pressure regulator having a diaphragm the outer face of which is submitted to the pressure of the surrounding medium, a flexible hose for connecting the respiratory tracts of the user with the chamber of the regulator adjacent to the inner face of the diaphragm, and a pipe for connecting the outlet of the breathable gas inlet valve with said flexible hose at a point of the latter intermediate its length outside said chamber.

6. An open circuit breathing apparatus according to claim 5, in which the pipe connected with the outlet of the breathable gas inlet valve enters the wall of said flexible hose and opens inside said hose at a point outside the chamber of the regulator adjacent to the diaphragm.

References Cited in the file of this patent

UNITED STATES PATENTS

| 2,269,500 | Wildhack | Jan. 13, 1942 |
| 2,596,178 | Seeler | May 13, 1952 |

FOREIGN PATENTS

| 663,202 | Great Britain | Dec. 19, 1951 |